United States Patent
Matsuoka et al.

(10) Patent No.: US 6,240,640 B1
(45) Date of Patent: Jun. 5, 2001

(54) METHOD FOR MANUFACTURING HONEYCOMB STRUCTURES MADE OF TITANIUM

(75) Inventors: Katsunori Matsuoka; Jun Nakajima, both of Tokyo (JP)

(73) Assignee: Showa Aircraft Industry Co., Ltd., Tokyo (JP)

( * ) Notice: Subject to any disclaimer, the term of this patent is extended or adjusted under 35 U.S.C. 154(b) by 0 days.

(21) Appl. No.: 09/348,151

(22) Filed: Jul. 6, 1999

(30) Foreign Application Priority Data

Nov. 19, 1998 (JP) .................................................. 10-346594

(51) Int. Cl.[7] .................................................. B21D 47/00
(52) U.S. Cl. ........................ 29/897.32; 29/897.2; 228/181
(58) Field of Search .................................... 228/118, 181; 29/897, 897.32, 897.2, 897.3, 897.31, 890.01, 890.039; 52/783.1, 793.1, 793.11

(56) References Cited

U.S. PATENT DOCUMENTS

| | | | |
|---|---|---|---|
| 3,906,617 | * 9/1975 | Behringer et al. ................... | 228/118 |
| 4,304,350 | * 12/1981 | Paez et al. ............................ | 228/118 |
| 4,549,685 | * 10/1985 | Paez ...................................... | 228/118 |
| 4,582,244 | * 4/1986 | Rainville .............................. | 228/118 |
| 4,916,027 | * 4/1990 | Delmundo ............................ | 228/118 |
| 5,050,299 | * 9/1991 | Rainville .............................. | 228/118 |
| 5,070,607 | * 12/1991 | Boardman et al. .................. | 228/118 |
| 5,226,578 | * 7/1993 | Douglas ............................... | 228/118 |
| 5,316,203 | * 5/1994 | Rowe et al. .......................... | 228/118 |
| 5,479,705 | * 1/1996 | Fowler et al. ........................ | 228/118 |
| 5,513,791 | * 5/1996 | Rowe et al. .......................... | 228/118 |
| 5,581,882 | * 12/1996 | Fowler et al. ........................ | 228/118 |

\* cited by examiner

*Primary Examiner*—I Cuda Rosch
*Assistant Examiner*—Trinh Nguyen
(74) *Attorney, Agent, or Firm*—Flynn, Thiel, Boutell & Tanis, P.C.

(57) ABSTRACT

A titanium honeycomb 1 is manufactured by using titanium or titanium alloy as the base material 2, performing diffusion bonding in a striped pattern with heating and pressing, and elongating the stacked base materials 2 . Further, a powder of rare earth oxide, such as yttrium oxide with a particle size of, for example, 30 $\mu$m or less, is employed as the parting agent 5. The oxide is mixed in an amount of 1% by weight or more with the organic binder vaporizing at 350° C. A parting agent is applied at a thickness of 0.3–30 $\mu$m.

5 Claims, 7 Drawing Sheets

F I G. 2
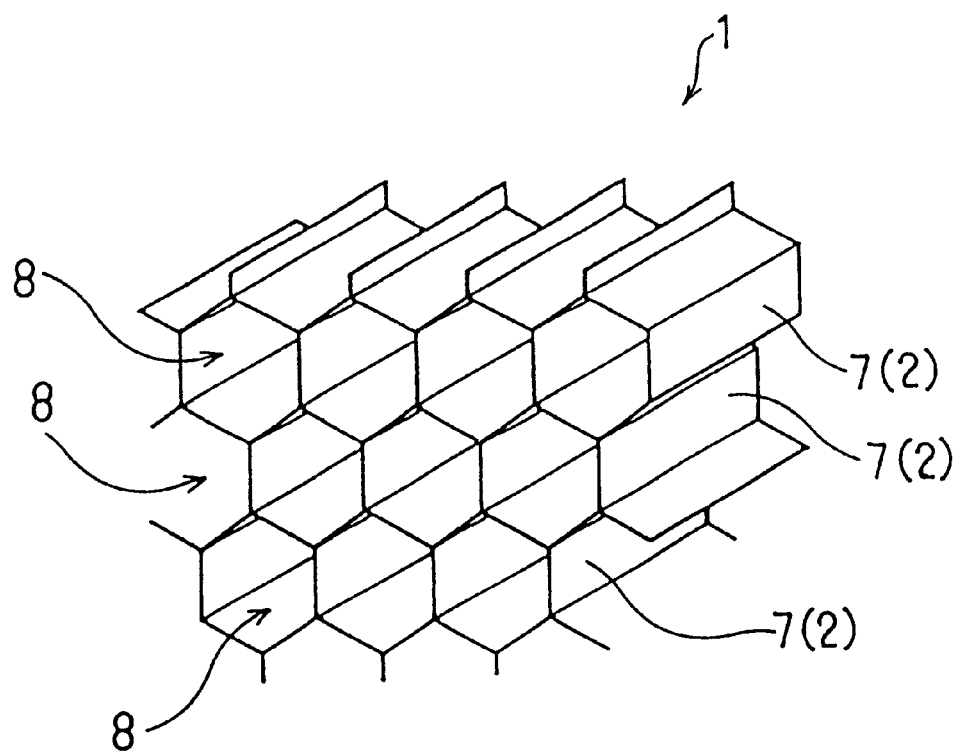

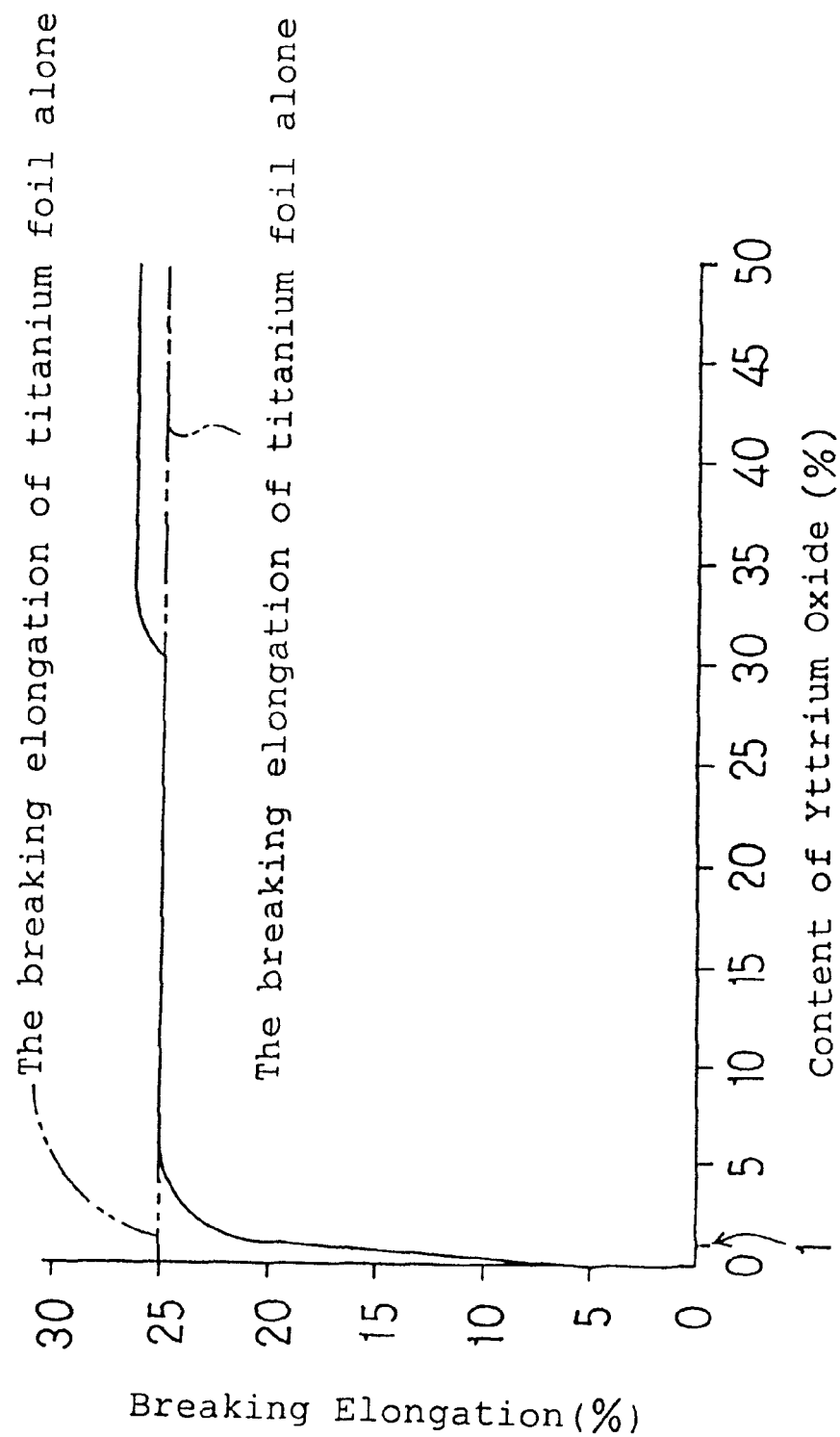

Bonding state of titanium honeycomb

METHOD FOR MANUFACTURING HONEYCOMB STRUCTURES MADE OF TITANIUM

BACKGROUND OF THE INVENTION

1. Field of the Invention

The present invention relates to a method for manufacturing honeycomb structures made of titanium, and in particular for manufacturing honeycomb structures consisting of a planar assembly of a number of hollow columnar cells with titanium or a titanium alloy used as base material.

2. Description of the Related Art

Honeycomb cores consisting of a planar assembly of a number of hollow columnar cells have a variety of excellent characteristics such as high ratios of strength to weight, and are widely used as various of construction materials. Although metals, plastics, papers, or the like are used as the base material for these honeycomb cores depending on their use, typical metals are aluminum (aluminum alloy) and stainless steel.

Conventionally, the honeycomb cores are manufactured in the corrugation or expansion process. And, bonding in a striped pattern between cell walls of the honeycomb cores are performed by ① spot welding, ② adhesion, ③ brazing.

In the corrugation process, after very thin foil-like base material is formed (corrugation) into corrugated sheets, a number of the corrugated sheets such formed are piled together in such a manner that the crests of a corrugated sheet and the troughs of the next corrugated sheet meet together with a half pitch shift between them. Each joint between the crests and troughs are bonded by ① using a spot welding device, ② adhesion with heating under pressure, ③ brazing a brazing material, or the like. Hereby, the honeycomb core having the cell walls made of the corrugated sheets piled, and consisting of the planar assembly of the number of hollow columnar cells that are separated by the cell walls, has been manufactured.

On the other hand, in the expansion process, after ② adhesive or ③ brazing material is applied in the striped pattern on the surfaces of very thin foil-like base material, a number of the base material sheets are piled with a half pitch shifting between them. Thereafter, the base material is bonded in a striped pattern with heating and pressing for ② adhesion or ③ brazing, and the base materials piled are elongated by tensile force in direction of the pile. Thus, the honeycomb cores having the elongated base material as cell wall, and consisting of the planar assembly of the number of hollow columnar cells that are separated by the cell wall, have been thus manufactured.

In the fields where honeycomb cores made of metal are used as structure materials, namely, honeycomb cores having base material of metal such as aluminum, aluminum alloy, stainless steel, or the like are used as structure materials, for example, in the fields for manufacturing structure materials and parts of aircraft, it is desired for honeycomb cores to become more and more light and stiff, and have higher heat resistance, corrosion resistance, and the like.

Then, in the field for manufacturing aircraft and the like, as materials having these high excellent characteristic, in stead of aluminum (aluminum alloy) and stainless steel, the use of titanium (a titanium alloy) has been progressed.

However, in spite of these backgrounds, regarding to the honeycomb structure having base materials of titanium or a titanium alloy (hereinafter abbreviated simply as "titanium honeycomb"), some problems described below are pointed out in the manufacturing process.

Concerning the method for manufacturing titanium honeycomb, some problems as follows have been pointed out, conventionally.

1. Although the titanium honeycomb has been conventionally manufactured by the corrugation process, in the corrugation process, complex process and high production cost have been pointed out, because piling and bonding were performed after the corrugated sheets have been formed in this process.

Further, large space has been required from first to end of the process after all, because formation of corrugated sheets requiring large space is performed in the first step before piling and bonding. Thus, it has been pointed out that large-sized titanium honeycomb or titanium honeycomb having many cells are manufactured with difficulty. That is to say, it has been difficult to manufacture a large block of titanium honeycomb or the honeycomb structure having small-sized cells by the use of the corrugation process.

In this way, concerning the conventional method for manufacturing titanium honeycomb, with employing the corrugation process, high production cost and difficulty of manufacturing the large-sized titanium honeycomb are pointed out. (These problems are generally pointed out not only in the manufacturing method of the titanium honeycomb, but also in a method for manufacturing honeycomb cores by the corrugation process.)

2. When titanium honeycomb is manufactured by the corrugation process, each joint between the corrugated sheets (the cell walls) piled are bonded by ① spot welding, ② adhesion, ③ brazing or the like as mentioned above.

And, first of all, in case of ① spot welding, it has been pointed out that the production cost becomes high because a number of spots have to be welded.

Furthermore, in the case of ② adhesion, it has been pointed out that the characteristics of the titanium honeycomb manufactured, such as stiffness, heat resistance, corrosion resistance, or the like are determined by the characteristics of the adhesive used. In other words, the difficulty is that the essential excellent characteristics of titanium or titanium alloy used as base material, such as stiffness, heat resistance, corrosion resistance, or the like, are not utilized.

Furthermore, in case of ③ brazing, occurrence of erosion, generation of intermetallic compounds, and inclusion of undesirable metals are pointed out as problems.

That is, the base materials of titanium or titanium alloy (corrugated sheets and cell walls) are corroded with brazing material by heat or pressure in brazing, and as a result, erosion which means formation of holes and exfoliation on the surfaces occurred easily. Further, it is easy to generate rigid and brittle intermetallic compounds between the base materials of titanium or titanium alloy (the corrugated sheets) and brazing material, as results of the reaction and fusion. In addition, difficulty occurs in corrosion resistance of the titanium honeycomb, with the resulting that the joints between the respective base materials of titanium or titanium alloy (the corrugated sheets and the cell walls) are bonded with the brazing material having the metals which are different from the metal of base material.

Therefore, in case of brazing, difficulties occur in the properties of the produced titanium honeycomb, such as stiffness, corrosion resistance, or the like. Therefore, the difficulty is that the excellent identities of titanium or a titanium alloy, for example, stiffness, corrosion resistance, or the like, are not utilized as base materials.

As described above, concerning the conventional methods for manufacturing titanium honeycomb, problems have been pointed out in production cost, stiffness, heat resistance, corrosion resistance, or the like, because the joint in respective base materials are performed by ① spot welding, ② bonding, and ③ brazing.

3. Considering the first problem described above, the expansion process has been employed instead of the corrugation process. Further, considering the second problem described above, the methods for manufacturing titanium honeycomb in which the diffusion bonding is performed for joining between respective base materials without ① spot welding, ② bonding, or ③ brazing, have been developed recently. Inventors and an applicant of the present invention have been invented such a method and filed this invention as Japanese Patent Application No.9-326912.

In the method employing the expansion process for manufacturing titanium honeycomb, first, parting agent is applied in a striped pattern to each of the foil-like base material of titanium or titanium alloy with regular widths and pitches. Before the direct diffusion bonding between respective base materials of titanium or a titanium alloy are performed in a striped pattern, it is necessary to apply the parting agent to no bonding portion other than bonding portion where the diffusion bonding is performed.

As the parting agent, L-hexagonal boron nitride is conventionally used in general processes. That is, when general metals are processed by heat treatments such as brazing or sintering, the parting agent containing L-hexagonal boron nitride is widely used. Because when the parting agent is applied to surfaces of metal instruments such as metal plate, jig, metal mold, or the like, it gives excellent parting effect, such parting agent containing L-hexagonal boron nitride is used in the methods for manufacturing titanium honeycomb.

However, when the parting agent containing L-hexagonal boron nitride is used for heat treatment of titanium or a titanium alloy as active metals, the parting agent loses the excellent parting effect, because brittle layers are made by the result of reaction between titanium or a titanium alloy and L-hexagonal boron nitride.

That is, in the method for manufacturing titanium honeycomb by the use of expansion process utilizing the diffusion bonding, when the parting agent containing L-hexagonal boron nitride is applied in a striped pattern on the base material of titanium or titanium alloy, a reaction occurs between surfaces of titanium or titanium alloy which is an active metal having high activity at high temperature, and L-hexagonal boron nitride contained in the parting agent applied. Hereby, hard and brittle intermetallic compounds such as titanium nitride, titanium boride, and the like are generated.

In this manner, brittle layer is formed on the surface of titanium or a titanium alloy as base material, and the brittle layer cracks. When the reaction further proceeds, the prescribed parting effect of the agent is lost.

For example, the parting agent containing hexagonal boron nitride (L-BN) is applied on the surface of foil-like titanium or titanium alloy, and heat treatment is performed. Thereafter, the temperature of the treated matter is returned to room temperature and tensile test is performed. As a result, breaking elongation point becomes much lower than that of the titanium or titanium alloy which is similarly treated except for applying the parting agent. The lowering of elongation is caused by the formation of the hard and brittle intermetallic compounds described above, namely the formation of the brittle layers.

In the method for manufacturing honeycomb cores made of titanium by employing expansion process in which bonding is performed by the diffusion bonding, when the parting agent containing hexagonal boron nitride (L-BN) is applied on the surfaces of foil-like titanium or a titanium alloy, reactions are occurred on the surface by the heat treatment for diffusion bonding. As results, the brittle layers are formed on the surfaces of titanium or a titanium alloy, elongation at the breaking point of the treated metals becomes low, and the prescribed parting effect of the agent is lost.

In the expansion process, the brittle layers formed on the base material cause breaking of titanium or titanium alloy as base materials piled. Further, insufficient expansion of the base materials makes elongation of the base materials made of titanium or titanium alloy and piled difficult. Eventually, when the prescribed parting effect of the agent is lost, elongation in the expansion process becomes impossible because respective base materials of titanium or titanium alloy are joined uniformly with each other by diffusion bonding.

Although method for manufacturing titanium honeycomb by employing expansion process in which diffusion bonding is used has been developed recently, the use of this method has not progressed. Because it is pointed out that parting agent applied for no bonding portion causes difficulty or impossibility in expanding the base materials made of titanium or titanium alloy (for corrugated sheet and cell walls).

Considering these matters, the method of the present invention for manufacturing the titanium honeycomb has been invented in order to solve the problems of the above-mentioned prior art which includes the method has been developed recently. The titanium honeycomb is manufactured through the steps of using the titanium or titanium alloy as base material, performing diffusion bonding in a striped pattern between these materials by heat treatment with pressing, and elongating these base materials. Further, powder of rare earth oxide such as yttrium oxide is employed as parting agent. The powder is mixed with, for example, the organic binder having 30 $\mu$m or less particle size and vaporizing at less than 350° C. in an amount of 1% by weight or more. This parting agent is applied in the thickness of 0.3–30 $\mu$m.

Therefore, the object of the present invention is to provide the method for manufacturing the titanium honeycomb having advantages as follows. First, the manufacturing cost of using the present invention is low so that large typed honeycomb structure can be manufactured. Second, the titanium honeycomb manufactured by the method of the present invention has high stiffness, heat resistance, and corrosion resistance because the features of the base material of titanium or a titanium alloy is made the best of. Third, brittle layers of the titanium honeycomb are not formed, parting effect of the parting agent applied is not lost, and, accidents in which a part of the titanium honeycomb is braked and difficulty or impossibility of expanding the titanium honeycomb are not happened, because the parting agent applied dose not react with the base materials of titanium or titanium alloy at the heat treatment.

SUMMARY OF THE INVENTION

Technical means to solve these problems are described as follows. The method of claim 1 comprises the steps of, at first, preparing a very thin foil-like titanium or titanium alloy as a base material, applying a parting agent in a striped pattern with regular pitches and widths at a regular interval onto surfaces of said base material so as to retain striped primary coats of said base material, piling a plurality of sheets of said base material in such a manner that said primary coats remaining and exposed are met together with a half pitch shift between them, performing diffusion bonding to said primary coats of said base material in a striped pattern with compression and heating so that elements of titanium or titanium alloy in said base material move and diffuse between said primary coats, and elongating with tensile force in the direction of piling said base material so that said base material is bent along the edge of said diffusion bonding in a striped pattern and portions that are not bound by diffusion bonding are detached and separated together. Therefore, the honeycomb structures made of titanium consisting of a planar assembly of a number of hollow columnar cells can be obtained.

The method is characterized in that as said parting agent a liquid or pasty mixture of rare earth oxide powder and a binder is used.

The method of claim 2 for manufacturing honeycomb structures made of titanium according to claim 1 is characterized in that said parting agent being mixed with said rare earth oxide powder in an amount of 1% by weight or more and said binder in an amount of less than 99% by weight.

The method of claim 3 for manufacturing honeycomb structures made of titanium according to claim 1 is characterized in that said rare earth oxide is yttrium oxide.

The method of claim 4 for manufacturing honeycomb structures made of titanium according to claim 1 is characterized in that the thickness of said parting agent applied is from 0.3–30 $\mu$m.

The method of claim 5 for manufacturing honeycomb structures made of titanium according to claim 1 is characterized in that the thickness of said base material is 200 $\mu$m or less.

The method of claim 6 for manufacturing honeycomb structures made of titanium according to claim 1 is characterized in that the sections of said cell and cell wall are equilateral hexagonal.

The method of claim 7 for manufacturing honeycomb structures made of titanium according to claim 1 or claim 4 is characterized in that the particle size of said rare earth oxide powder is 30 $\mu$m or less.

The method of claim 8 for manufacturing honeycomb structures made of titanium according to claim 1 is characterized in that said binder of said parting agent is organic.

The method of claim 9 for manufacturing honeycomb structures made of titanium according to claim 8 is characterized in that said binder of said parting agent is an organic matter vaporizing at less than 350° C.

The present invention is constructed as described above. Therefore, the effects of the present invention are illustrated as follows. In the method for manufacturing the titanium honeycomb, the base material of titanium or titanium alloy is like a thin foil, and the parting agent is applied in a striped pattern with remaining the primary coat. After the base materials are piled with a half pitch shift between them, they are bounded by diffusion bonding.

The primary coats exposing on the surface of the base materials are contacted, met, and bound with each other with forming the diffusion bonding portions. Thus, the base materials piled are bound directly and closely with each other by diffusion bonding between the diffusion bonding portions formed in a striped pattern because the elements of titanium or titanium alloy move and diffuse between the primary coats.

Thereafter, the titanium honeycomb of a planner assembly of a number of the hallow columnar cells having the cell walls is obtained by elongating the base materials piled and bound by diffusion bonding in this manner with tensile force.

In the method for manufacturing the titanium honeycomb, the mixture of rare earth oxide powder such as yttrium oxide powder in an amount of 1% by weight or more and the organic binder, for example, the binder vaporizing at not more than 350° C. is employed as the parting agent for applying in a striped pattern to the base material.

Although this parting agent employs an oxide of rare earth element having low standard free energy of formation (heat of formation) $\Delta$H, the standard free energy of rare earth oxide is lower than that of titanium or titanium alloy. Thus, the parting agent does not react with the base material in the heat treatment for diffusion bonding, because rare earth oxide employed in the parting agent is stable to heat and chemical agent.

Further, in this parting agent, an organic binder vaporizing at less than 350° C. is employed instead of the inorganic binder containing metal. Therefore, the binder used in the parting agent does not remain to react with the base material in the heat treatment at 350° C. or more.

When the parting agent is applied to the base materials of titanium or titanium alloy being active metal, the parting agent does not react with titanium or titanium alloy on the surfaces of the base material, because the parting agent comprises of such mixture of the rare earth oxide and the binder. Accordingly, the formation of brittle layer on the surface of base material is prevented. The portion on which diffusion bonding is not performed can be determined on the base material of titanium or titanium alloy, because when the parting agent is applied in a thickness of 0.3 $\mu$m or more, the parting agent shows the parting effect expected.

In addition, because the parting agent in which the size of rare earth oxide is 30 $\mu$m or less is applied to a thickness of 30 $\mu$m or less, the diffusion bonding portions on the base materials made of titanium or titanium alloy and piled can be joined each other in a striped pattern definitely.

BRIEF DESCRIPTION OF THE DRAWINGS

FIG. 2 is a perspective view of the titanium honeycomb, illustrating the preferred embodiment of the invention.

FIG. 4 is a graph showing the relation between the breaking elongation and the amount of yttrium oxide in the parting agent and illustrating the preferred embodiment of the invention.

DESCRIPTION OF THE PREFERRED EMBODIMENT

Figure 1A:
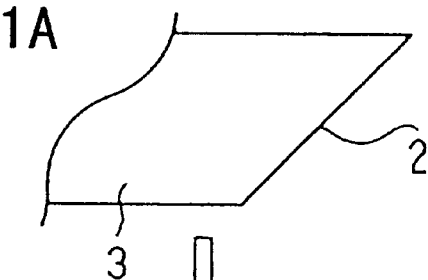
FIG. 1 is a perspective view showing a preferred embodiment of the method for manufacturing the titanium honeycomb according to the present invention, wherein A shows the prepared base material, B shows the base material to which the parting agent is applied, C shows the base material in the cut-off state, D shows the piled base material, E shows the diffusion-bonded base materials, and F shows the elongated base materials.

The present invention is described below in detail, taking an embodiment illustrated in different steps of a manufacturing process in the drawings.

In the manufacturing method of the titanium honeycomb, as shown in FIG. 1A, strip shaped and very thin foils made of titanium or titanium alloy are prepared as base materials 2.

Detail description about the base materials 2 will be as follows. As the base materials 2, in addition to titanium, titanium alloys are used. Examples of metallic elements added to the titanium alloy include aluminum, vanadium, chrome, manganese, iron, zirconium, molybdenum, and tin. Representative examples of these titanium alloys include Ti—5Al—2.5Sn ($\alpha$ alloy), Ti—3Al—2.5V ($\alpha$-$\beta$ alloy), and Ti—6Al—4V.

The base materials 2 made of titanium or titanium alloy are elongated with pressure and they are formed to strip shape. For example, the thickness of the base materials preferably used is not more than 200 $\mu$m. The base material preferably has an average of surface roughness Ra of 5 $\mu$m or less. Since the base materials have such averages of surface roughness, closeness of the base materials piled as described below becomes high and diffusion bonding becomes to be easily performed by applying low load at pressing.

Figure 3A:
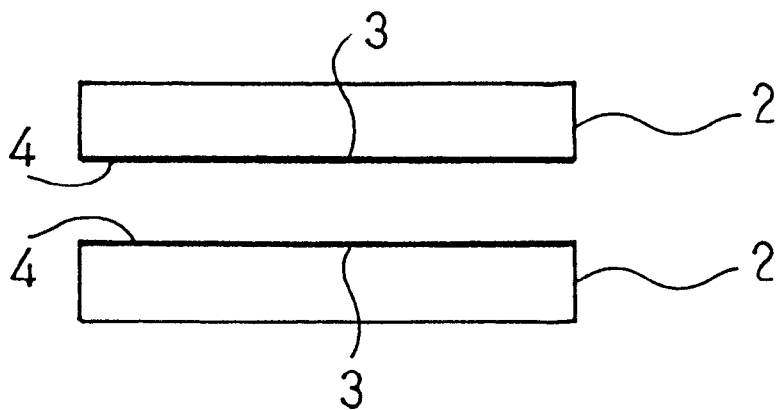
FIG. 3 is a schematic view for illustrating the principle of the preferred embodiment of the present invention, wherein A shows the main part of a pair of the base materials for bonding, B shows the pilled base materials, C shows the base materials heated and pressed, D shows the diffusion-bonded base materials.

Furthermore, as shown in FIG. 3A, the surfaces primary coat 3 of the base material 2 consisting of titanium or titanium alloy is usually covered by oxidation film 4.

The base material of titanium or titanium alloy prepared by such a way is properly cleaned as occasion requires. Representative example of the method of cleaning is degreasing. Examples of solvents for this degreasing include non-chrolic solvents such as acetone, methylethyl ketone (MEK), alcohol. Examples of methods for such degreasing include vapor degreasing, soak cleaning, ultrasonic cleaning, or the like.

Furthermore, washing with acid is properly performed, if necessary. Examples of the acid used washing include 20–45% of nitric acid or 2% of hydrofluoric acid.

Cleaning such as degreasing or washing with acid is not necessarily required in this manufacturing method and such cleaning is performed only in case of necessity. Because when heat treatment for diffusion bonding is performed later, dirt such as oil stuck to the surfaces of primary coat 3 of the base material 2 made of titanium or titanium alloy vaporizes at 350° C. or less in the course of heating. The oxidation film 4 is diffused and removed by this treatment, too. Therefore, cleaning is not required except that the dirt is remarkable or the oxidation film 4 is thick. The base material 2 is treated by this way.

Figure 1B:
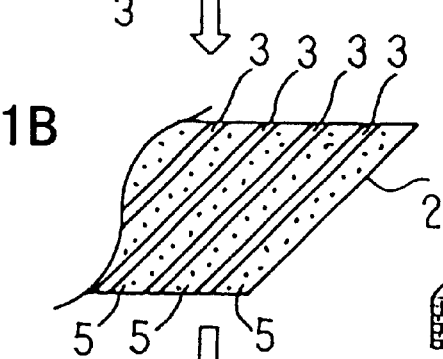

At next step in the manufacturing method, a parting agent 5 is applied in a striped pattern at regular interval so as to retain the striped primary coat 3 as shown in FIG. 1B.

That is, the parting agent 5 in the example shown in the FIG. 1 is applied to one side of the base material of titanium or titanium alloy at regular interval and pitch so as to retain primary coat 3 with regular width at regular pitch. Such application is performed by, for example, spray printing, screen printing, roller printing, transfer printing, and other printing process.

Application of the parting agent 5 is not limited by the example shown in the FIG. 1 and the agent may be applied both sides of the base material 2. In this case, diffusion bonding and expansion process is performed, after one base material 2 where the parting agent 5 is applied to the both sides and another base materials 2 where the parting agent 5 is applied to the one side are piled by turns as described below.

The parting agent 5 will be described below.

Figure 1E:
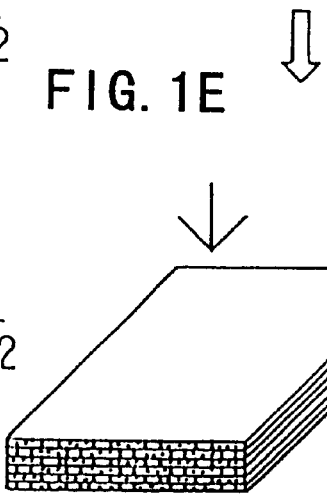
Figure 1C:
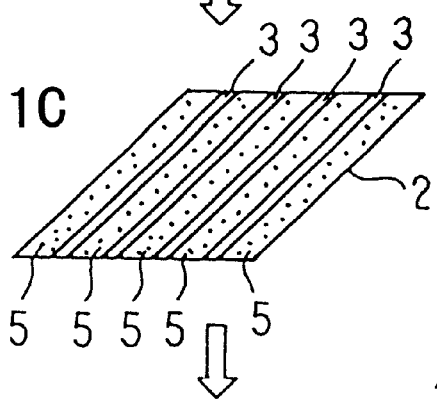

In the manufacturing method, the parting agent 5 is applied as shown in FIG. 1C. After that, a band of the base material 2 made of titanium or titanium alloy having the striped primary coat 3 remained on the surface is cut to regular length (for example, 600 mm×100 mm). The base material 2 may be cut to regular length before application of the parting agent 5.

Figure 1D:
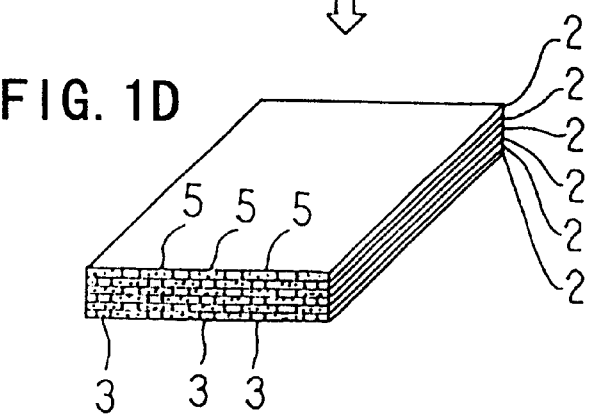
Figure 3B:
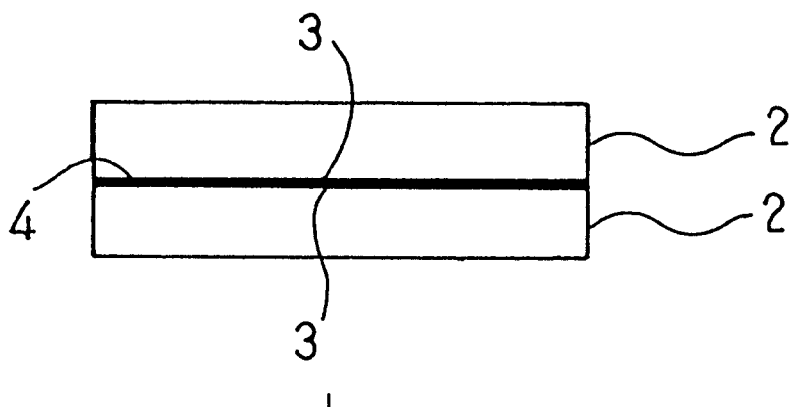

As shown in FIG. 1D and FIG. 3B, a plurality of, for example, four hundreds of the base materials 2 cut in this manner are piled to form a block in such a manner that the pitch of the primary coat 3 exposed and remained in a striped pattern between the parts to which the parting agent 5 applied meet together with a half pitch shift between them. In the example shown in this Figure, the upward and downward base material 2 are piled in such a manner that the pitch of the primary coat 3 remained on the one side of these respective materials in a striped pattern meet together with a half pitch shift between them.

Figure 3C:
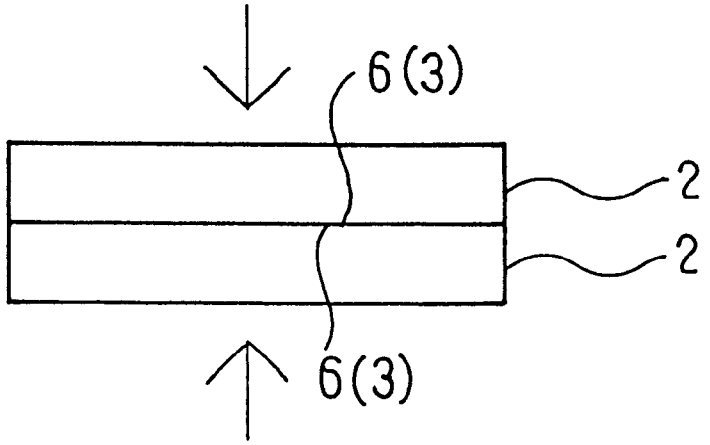
Figure 3D:
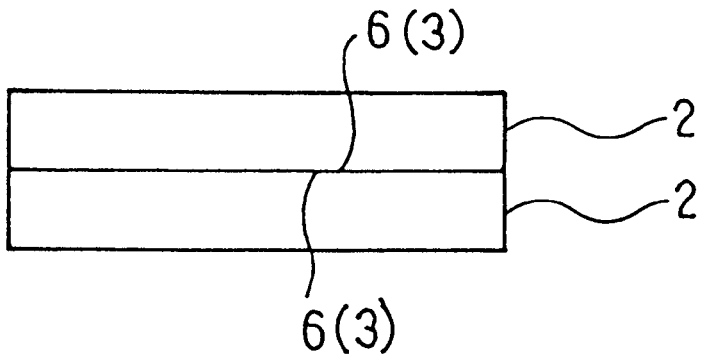

Then, in the process of this manufacturing method, as shown in FIG. 1E, FIG. 3C, and FIG. 3D, the primary coats 3 remained in a striped pattern between the parts to which the parting agent 5 applied are joined with pressing and heating so as to perform diffusion bonding in a striped pattern between the base materials piled in longitudinal direction extending upward and downward.

Further descriptions about such diffusion bonding are as follows. The base materials 2 piled are treated under conditions of ① temperature, ② pressure, ③ atmosphere, ④ time, or the like, described as follows.

By this treatment, elements of titanium or titanium alloy in grain boundary are transferred between the one primary coat 3 exposed in a striped pattern on the base material 2 which are adjacent to the other material 2 and the other primary coat 3 exposed on the whole of the surface of the other material 2, as shown in the figure so that diffusion bonding portion 6 joined in a striped pattern by diffusion bonding is formed. That is, the transfer is performed between the primary coats 3 which are between the no bonding portions predetermined by application of the parting agent, are exposed in a striped pattern, are contacted with each other closely.

The oxidation film 4 (reference to FIG. 3B) covering on the primary coat 3 of the surface of titanium or titanium alloy as the base material are diffused, destroyed, removed and disappeared by the heat treatment described above in preference to occurrence of such diffusion bonding. Because oxides of the film diffuse into and dissolve in titanium or titanium alloy used as the base material 2.

Conditions of the heat treatment for performing diffusion bonding are as follows. ①Conditions of temperature (temperature for the heat treatment) are determined at 700° C. or more, for example. That is, when the base material 2 is made of titanium, the temperature is determined, for example, at 885° C. that is β transformation point or more. When the base material 2 is made of titanium alloy, temperature is determined in the range of 900–1000° C. where is, for example, β transformation temperature range (temperature range of α+β phase). That is, temperature is determined in the range where each of the base material 2 shows superplasticity.

However, when the conditions of temperature do not accord with these examples and temperature is determined under these temperatures, diffusion bonding can be performed by determining conditions of pressure ② higher or conditions of time longer ④. Temperature in the furnace or the like where diffusion bonding is performed is determined in this way.

The condition of pressure ②, namely load for pressing upward and downward on the base materials 2 piled (load for performing diffusion bonding) differs depending on other conditions such as ① temperature, ③ atmosphere, and ④ time, and is preferably 0.001 kg/mm$^2$ or more. When load is less than 0.00001 kgf/mm$^2$, junction and strength of diffusion bonding between the diffusion bonding part 6 of the base materials 2 are not sufficient.

The condition of ③ atmosphere is determined to inert atmosphere or vacuum. Therefore, this heat treatment is performed in a vacuum or inert atmosphere furnace.

The condition of ④ time, namely time for heating and pressing is determined in the range of 5 minutes to 10 hours, for example, 30 minutes, 1 hour, 2 hours. Diffusion bonding is performed under these conditions such as ① temperature, ② pressure ③ atmosphere, ④ time, or the like.

In this manufacturing method, diffusion bonding is performed in a striped pattern between the base materials 2 piled to form a block. When remainders of oxidation films are found on the surfaces or the edge of the block, these remainders are cut or removed.

Then, such block is cut into required size by high-pressure water-jet machining.

Figure 1F:
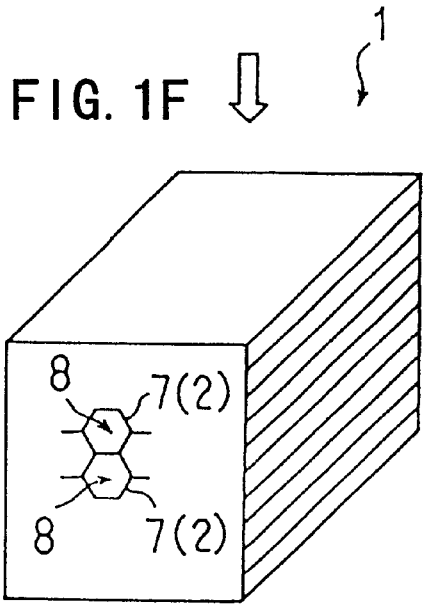

Thereafter expansion process is perfumed in this manufacturing method as shown in FIG. 1F next. By elongating the base materials in pile direction, respective base material piled are bent along the edge of respective diffusion bonding parts 6 in a striped pattern and application parts of the parting agent 5 other than diffusion bonding parts 6 are separated and isolated.

Therefore, the base materials 2 made of titanium or titanium alloy piled into a block and performed diffusion bonding in a striped pattern, are expanded by elongating in upper and lower direction of piling. Thus, each of the base materials 2 is bent along the upper and lower edges of the diffusion bonding parts 6 in a striped pattern and parts between the diffusion bonding parts 6 are separated and isolated upward and downward.

A titanium honeycomb 1 is manufactured by passing through each of these processes in this manufacturing method employing expansion process using the diffusion bonding. The titanium honeycomb 1 has the base material made of titanium or titanium alloy as a cell wall 7, and consists of a planar assembly of a number of hollow columnar cells 8 sectioned by the cell walls 7. As mentioned above, titanium or titanium alloy is used as the base material of the cell wall 7, and the cell wall 7 is consisted by performing diffusion bonding in a striped pattern by heating or pressing.

Although typical shape of cross-section of cell 8 sectioned with cell wall 7 is regular hexagon, the shape is not limited to regular hexagon and may be long hexagonal elongated to longitudinal or horizontal, trapezoid, square, and the other similar shapes.

Further, in most cases, boards for face are joined to both sides of the edge of the columnar cells of the titanium honeycomb 1 so as to use it as honeycomb-sandwiched panel. Titanium honeycomb 1 and the honeycomb sandwiched panel made of it have high ratios of strength to weight, lightness, high stiffness, and high strength, as well as general honeycomb core. In addition, the titanium honeycomb 1 has characteristics such as excellent effect of rectifier and respective surface aria in a unit volume. The honeycomb sandwiched panel of it is excellent in precision of plane, maintenance of temperature, and insulation of sound.

Moreover, as a result of making the use of characteristics of titanium or titanium alloy used as the base material 2, the titanium honeycomb 1 is excellent in lightness, strength, heat resistance, corrosion resistance, or the like. Therefore, the titanium honeycomb 1 is used in, for example, construction materials and parts of aircraft, and the other kind of use. The titanium honeycomb 1 is consisted by these processes.

The present invention employs the parting agent 5 described next in the manufacturing method of titanium honeycomb 1. The parting agent 5 employed in this manufacturing method will be described in detail as follows.

The parting agent 5 is used for application, when titanium or titanium alloy as the base material is treated by heating for diffusion bonding. The parting agent is consisted by mixing powdered oxide of rare earth element with binder and is liquid or paste like.

Titanium or titanium alloy as the base material 2 is active metal that has strong affinity for oxide, hydrogen, and nitrogen, high reduction power, and high reactivity. On the other hand, this parting agent 5 is consisted by powdering oxide of rare earth metal and mixing the powder with binder so as to make liquid or paste having a certain viscosity.

Description of rare earth metal oxides employed for the parting agent 5 is as follow. It is well known that rare earth metals such as yttrium, scandium, lanthanoides, and actinoides, have low standard free energy of formation (heat of formation).

Among compounds of elements, for example, nitrides, oxides, sulfides, chlorides, and carbides, oxides have low standard free energy of formation (heat of formation).

Thus, rare earth metal oxides, for example, yttrium oxide (yttria) $Y_2O_3$, cerium oxide $Ce_2O_3$, thorium oxide $ThO_2$, have high heat and chemical stability, and hard to react with active metal such as titanium or a titanium alloy.

On the other hand, although alkali metals and alkaline earth metals, such as lithium, beryllium, magnesium, calcium, and the like have low standard free energy of formation (heat of formation), they can not be employed for the parting agent. Because these metals have high ionicity and they are easy to react with active metals such as titanium and a titanium alloy.

Standard free energies of formation (heat of formation) ΔH of titanium oxides are shown in following Table 1. A standard free energy of formation (heat of formation) ΔH of the oxide in the parting agent has to be lower than −1036 in order to avoid such reaction.

On the other hand, the standard free energies of formation (heat of formation) ΔH of rare earth metal oxides are lower than −1036 as shown in Table 2. Accordingly, titanium does not react with oxygen in the oxides shown in Table 2 and the resulting formations of the oxides shown in Table 1 never occur.

In the parting agent 5, the rare earth metal oxides are employed for this reason.

TABLE 1

| Titanium oxides | Heat of formation (when a compound (an oxide) reacts with oxygen of 1 mol) : ΔH (Kjmol$^{-1}$) |
| --- | --- |
| TiO | −983.4—1036 |
| TiO$_2$ | |
| Ti$_2$O$_3$ | |
| Ti$_3$O$_4$ | |

TABLE 2

| Rare earth oxides | Heat of formation (when a compound (an oxide) reacts with oxygen of 1 mol) : ΔH (Kjmol$^{-1}$) |
| --- | --- |
| Y$_2$O$_3$ | −1270 |
| Ce$_2$O$_3$ | −1213 |
| ThO$_2$ | −1227 |

The following descriptions are concerned with binder in the parting agent 5. An organic binder vaporizing at 350° C. or more is employed in this parting agent 5 as a binder for the rare earth metal oxide powder.

When the heat treatment is performed, titanium as active metal reacts with a metal element at 350° C. or more. Inorganic binders such as sodium oxide, silica, aluminum acetate, and sodium borate contain metal elements. As the metal still remain at 350° C. or more, the metal elements react with titanium at the heat treatment. Since the binders employed in the parting agent 5 are organic, the metal elements reacting with titanium no longer remain at 350° C. or more when the heat treatment is performed.

Further, titanium reacts with elements having light atomic weight, such as carbon, hydrogen, oxygen, and nitrogen at 350° C. or more when the heat treatment is performed. Therefore, the organic binders vaporizing at less than 350° C., such as polyvinyl alcohol(PVA) and polyvinyl acetate (PVAc), are employed in the parting agent 5. As a result, when the heat treatment at 350° C. or more is performed, the elements such carbon do not remain in the binder, and the occurrence of the reaction with titanium is avoided.

Thermoplastic resin is suitable preferable as such organic binder because it is easily pyrolyzed at a temperature less than 350° C. As such resin, there are polyvinyl acetate, partially saponified polyvinyl acetate, polyvinyl acetal group (such as polyvinyl alcohol, polyvinyl formal, polyvinyl ethanal, polyvinyl propanal, polyvinyl butylal, and polyvinyl benzal), and the like. (The binders in this specification include the binders diluted by the solvent selected from an aliphatic alcohol group, ketone group, an aromatic group or the like.)

The organic binders vaporizing at 350° C. or more are employed in the parting agent 5 for these reasons.

The parting agent 5 is obtained by mixing rare earth oxide powder and the organic binder vaporizing at less than 350° C.

Although the parting agent 5 is used by application when the base materials 2 made of active metals such as titanium or titanium alloy are heated for diffusion bonding, the parting agent does not react with the base materials 2 by heating for the heat treatment. As a result, the hard and brittle metal compounds and the brittle layers are never formed on the surfaces of titanium or titanium alloy as the base material 2.

EXAMPLES

Examples 1–5 referring to this parting agent 5 will be described bellows.

Example 1

FIG. 4 is a graph showing the relation between the breaking elongation of the titanium foil and the amount of yttrium oxide contained in the parting agent.

Several kinds of the parting agents were prepared by varying the mixture ratio of yttrium oxide powder as one example of rare earth oxide powders and binder in Example 1 as shown in FIG. 4. After each of the parting agents prepared in this manner was applied to the both surfaces of the titanium foil having a thickness of 50 μm, the heat treatment under vacuum at 900° C. was performed for these foils. After cooling to room temperature, the tensile test was performed to these foils.

Whether or not the titanium foil reacted with the parting agent in the heat treatment, that is, whether or not the intermetallic compounds were produced, and whether or not the brittle layers were produced on the surfaces of the titanium foil, were judged by evaluating the breaking elongation of each of the titanium foils to which the parting agents were applied.

The particle size of yttrium oxide contained in each of the parting agents was 1 μm, and the tensile rate of the test was 15 mm/min.

Results of Example 1 were shown in FIG. 4. When the parting agent was not applied, the breaking elongation of the titanium foil was 25%. On the other hand, when the parting agent containing yttrium oxide in an amount of 1% by weight (and binder in an amount of 99%), the same breaking elongation as that of the above mentioned titanium foil to which the parting agent was not applied was obtained.

Especially, when the mixture ratio of the yttrium oxide was 3% by weight (and binder was 97% by weight) and when the mixture ratio of the yttrium oxide was 5% by weight (and binder was 95% by weight), the breaking elongation was the same as that of the above mentioned simple titanium foil to which the parting agent was not applied, that is, about 25%.

As these results, it turned out that when the parting agent used in the present invention containing yttrium oxide as a rare earth oxide in an amount of 1% by weight was applied to the foil made of an active metal such as titanium or titanium alloy, used as the base material, the reaction between these substances did not occur and the brittle layer was not formed.

These facts were observed by Example 1.

Example 2

Figure 5:
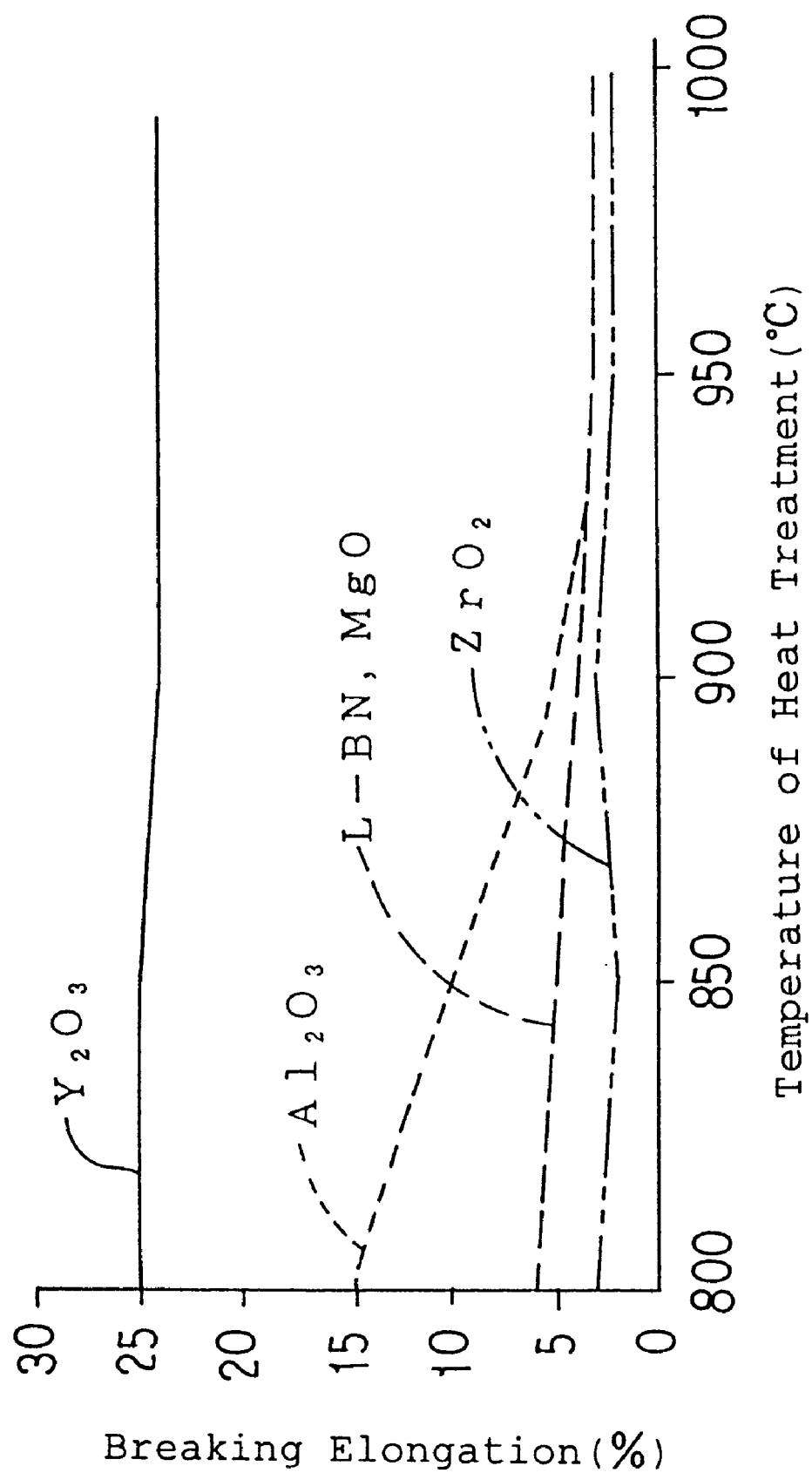
FIG. 5 is a graph showing the relation between the breaking elongation and the temperature of the heat treatment and illustrating the preferred embodiment of the invention.

FIG. 5 is a graph showing the relation between the breaking elongation and the temperature of the heat treatment.

In Example 2 as shown in FIG. 5, the parting agent used in the present invention were prepared by mixing yttrium oxide powder as one example of rare earth oxide powder and the binder. Further, various parting agents comprising other materials were prepared. These parting agents prepared include a mixture of hexagonal boron nitride (L-BN) powder and a binder, a mixture of aluminum oxide powder and a binder, a mixture of magnesium oxide powder and a binder, the mixture of zirconium oxide powder and a binder, and the like.

In this example, the mixture ratio of the parting agent and the binder was 3:10 expressed in an amount of percentage by weight, and the particle size of the powder was 1 μm.

After these parting agents prepared in this manner were applied to the both surfaces of the titanium foil having the thickness of 50 μm, the heat treatment at 800–1000° C. under vacuum was performed to these foils. And then, after cooling to room temperature, the tensile test was performed for these foils. The tensile rate of the test was 15mm/min.

Whether or not the titanium foil reacted with the parting agents in the present invention and the others in the heat treatment, that is, whether or not the intermetallic compounds were produced on the surfaces of the titanium foil, and whether or not the brittle layers were formed, were judged by evaluating the breaking elongation of each of the titanium foils to which the parting agents were applied.

Results of Example 2 were shown in FIG. 5. Although the breaking elongation of the titanium foil was 25% when the parting agent was not applied to the foil, when the parting agent used in the present invention and made of the mixture of yttrium oxide and the binder was applied to the foil, the breaking elongation of the foil at each of the temperatures was same as that of the above mentioned simple titanium foil, that is, about 25%.

However, the other parting agent than that used in the invention was applied to the foils, the breaking elongation of the foil lowered, and was not more than 15%. Most of these breaking elongations were not more than 5%.

As these results, the fact observed was that when the parting agent used in the present invention, containing yttrium oxide as a rare earth oxide was applied to the foil made of an active metal such as titanium or titanium alloy, used as the base material, the reaction did not occur and the brittle layer was not formed between these substances at the heat treatment.

On the other hand, the fact observed was that when the other parting agent than that used in the present invention, was applied to the foil, the brittle layer was formed between these substances by reacting with the foil of titanium or titanium alloy at the heat treatment and the breaking elongation of the foil was very lower. These facts were observed by Example 2.

TABLE 3

| A parting agent | A group of the periodic table | Parting effect | Breaking elongation % | Reaction |
| --- | --- | --- | --- | --- |
| Titanium foil only | (For Comparative Example) | Diffusion bonding | 26 | — |
| MgO | Alkaline earth metals | ○ | 13 | Yes |
| CaO | | ○ | 12 | Yes |
| ZrO₂ | Titanium group | Δ | 2 | Yes |
| TiO₂ | | X | — | Yes |
| VO | Earth-acids | ○ | 12 | Yes |
| Cr₂O₃ | Chrome group | Δ | 15 | Yes |

TABLE 3-continued

| A parting agent | A group of the periodic table | Parting effect | Breaking elongation % | Reaction |
| --- | --- | --- | --- | --- |
| MnO | Mangan group | Δ | 14 | Yes |
| Fe₂O₃ | Iron group | Δ | 16 | Yes |
| Cu₂O₃ | Copper group | X | — | Yes |
| ZnO | Zinc group | Δ | 11 | Yes |
| α-Al₂O₃ | Aluminum group | ○ | 5 | Yes |
| γ-Al₂O₃ | | ○ | 3 | Yes |
| Si₂O | Carbon group | X | — | Yes |
| Y₂O₃ | Rare earth elements | ◎ | 25 | No |
| Ce₂O | | ◎ | 27 | No |
| ThO₂ | | ◎ | 26 | No |

Example 3

The following descriptions are referred to Example 3. Table 3 illustrated above shows the parting effect, breaking elongation, and occurrence of the reaction between the parting agent in the present invention or the other parting agent comprising other oxides and the titanium foil.

In Example 3 as shown in Table 3, the parting agents in the present invention were prepared by mixing powder of respective rare earth oxides inclusive of yttrium oxide, cerium oxide, and thorium oxide with the binder. The other parting agents were prepared by mixing powder of various kinds of oxides with the binder, respectively.

In this example, the mixture ratio of the parting agent and the binder was 3:10 expressed in an amount of % by weight, and the particle size of the powder was 1 μm. These parting agents prepared in this manner were applied to the both surfaces of the titanium foil having the thickness of 50 μm. Then, a plurality of the foils to which the parting agent in the present invention or the other parting agents was applied respectively, were piled with each other.

The heat treatment at 900° C. under vacuum was performed to these titanium foils piled in this manner. After cooling to room temperature, whether or not the plurality of the titanium foils piled with each other were separated with without being joined by diffusion bonding, that is, whether or not these agents had the parting effect, were tested.

Thereafter, the tensile test was performed on the foils which had been separated and to which the parting agent having the parting effect was applied. The tensile rate of the test was 15 mm/min. In this manner, whether or not the titanium foil reacted with the parting agents in the present invention or the others in the heat treatment, that is, whether or not the intermetallic compounds were produced on the surfaces of the titanium foil, and whether or not the brittle layers were formed, were judged by evaluating the breaking elongation of the respective titanium foils to which the parting agents were applied.

Results of Example 3 were shown in Table 3 mentioned above. Referring to the parting effect, when the parting agent in the present invention, employing rare earth oxides such as yttrium oxide, cerium oxide, or thorium oxide as was applied to the foil, diffusion bonding between the titanium foil did not occurred and the parting effect of the respective agents was very well (this results were indicated in Table 3 by ◎ mark)

On the other hand, when the other parting agent employing other kinds of oxides was applied to the foil, the parting effect varied depending on the kind of the parting agent. Diffusion bonding was not performed between the titanium foils and the results were divided into the three groups. That is, in one group (indicated by ○ mark in Table 3), the parting effect which is somewhat less than that of the present invention was able to be obtained without joining by diffusion bonding between the titanium foils. In another group (indicated by Δ mark in Table 3), the parting effect which is less than that of the present invention was able to be obtained with joining by diffusion bonding between a part of the titanium foils. In the other group (indicated by X mark in Table 3), the parting effect was not obtained and diffusion bonding between the titanium foils was performed so completely that the titanium foils were not separated from each other.

Whether or not the agent reacted with the foil is judged by the value of the breaking elongation and the results are described as follows. All the foils (indicated by ◎, ○, and Δ marks except for X mark) in which the parting effect of the parting agent applied had been ascertained by the above mentioned manner were tested for tensile strength. The results of these tests were as follows.

Although when the parting agent was not applied to the titanium foil, the breaking elongation of the foil was 26%, when the parting agent in the present invention having a rare earth metal oxide was applied to the foil, the breaking elongation obtained was nearly to 26%, for example, 25%, 26%, or 27%. On the other hand, when the parting agent having other oxide was applied to the foil, the breaking elongation very lowered. Even if it was higher, the value was at most 16% and the least was about 2%.

From these results, it turned out that when the parting agent used in the present invention, having a rare earth metal oxide, is applied to the foil made of active metal such as titanium or titanium alloy as the base material, the parting agent does not react with the metal in the heat treatment in order for diffusion bonding and the parting agent in this invention has excellent parting effect.

On the other hand, it turned out that the parting agent other than that used in the present invention, having other oxide, is applied to the foil, the parting agent reacts with the titanium or titanium alloy in the heat treatment and the parting effect of the parting agent is inferior to that of the parting agent used in the present invention.

Example 4

Figure 6:
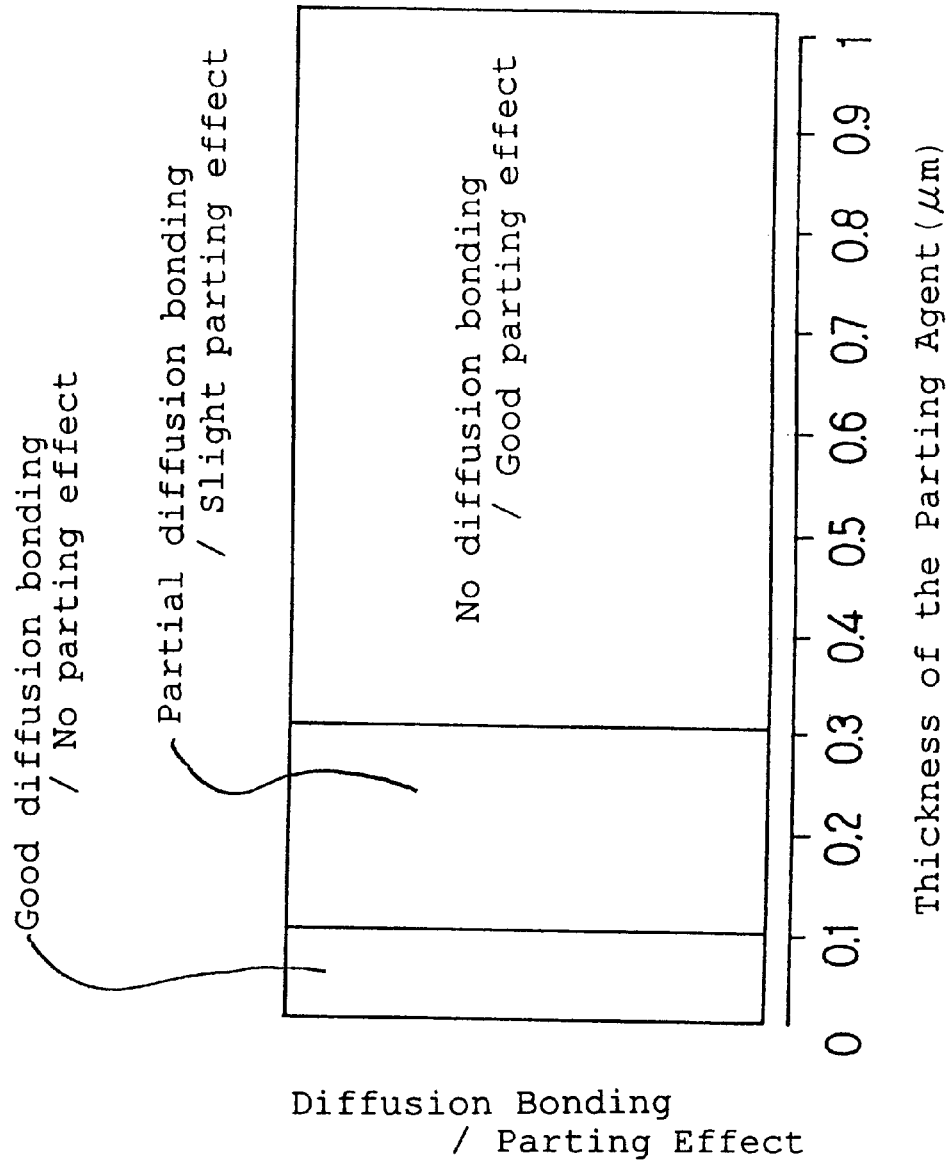
FIG. 6 is a diagram showing the ranges illustrating the relationship between the parting effect and the thickness of the parting agent applied and illustrating the preferred embodiment of the invention.

FIG. 6 is a diagram showing the area of the relation between the parting effect and the thickness of the parting agent applied.

In Example 4 as shown in FIG. 6, the parting agent used in this invention was first prepared by mixing powder of yttrium oxide as one example of a rare earth metal oxides with the binder in the ratio of 3 to 7 in wt %. The parting agent prepared in this manner was applied to each surface of the two titanium foils having the thickness of 50 μm. In this application, the thickness of the parting agent applied to each pair of the foils was varied to various sizes.

And then, two foils having same thickness of the parting agent applied were piled each other to sandwich the parting agent and these pairs of the foils were heated at 900° C. for 480 minutes while pressing with 1 Kg/mm². After these pairs of the foils were cooled to room temperature, whether or not the parting agent was effective, that is, whether or not the pair of the titanium foils was able to separate each other without joining with diffusion bonding was tested.

The results of Example 4 were shown in FIG. 6. As the result of examining the group of the titanium foils having not less than 0.3 μm thickness of the parting agent applied, joining between the pair of the titanium foils by diffusion bonding was not observed and the parting effects observed were very well.

On the other hand, as the result of examining the group of the titanium foils having from not less than 0.1 μm to not more than 0.3 μm thickness of the parting agent applied, the pair of the titanium foils were partly joined with each other by diffusion bonding and the parting effects were hardly observed.

As the result of examining the group of the titanium foils whose thickness of the parting agent applied was as thin as less than 0.1 μm, the pair of the titanium foils were completely joined each other by diffusion bonding and the parting effects were not observed at all.

Consequently, the point turned out in Example 4 is that the thickness for applying the parting agent used in the present invention to the titanium or titanium alloy foil as base material was preferably 0.3 μm or more.

Example 5

Figure 7:
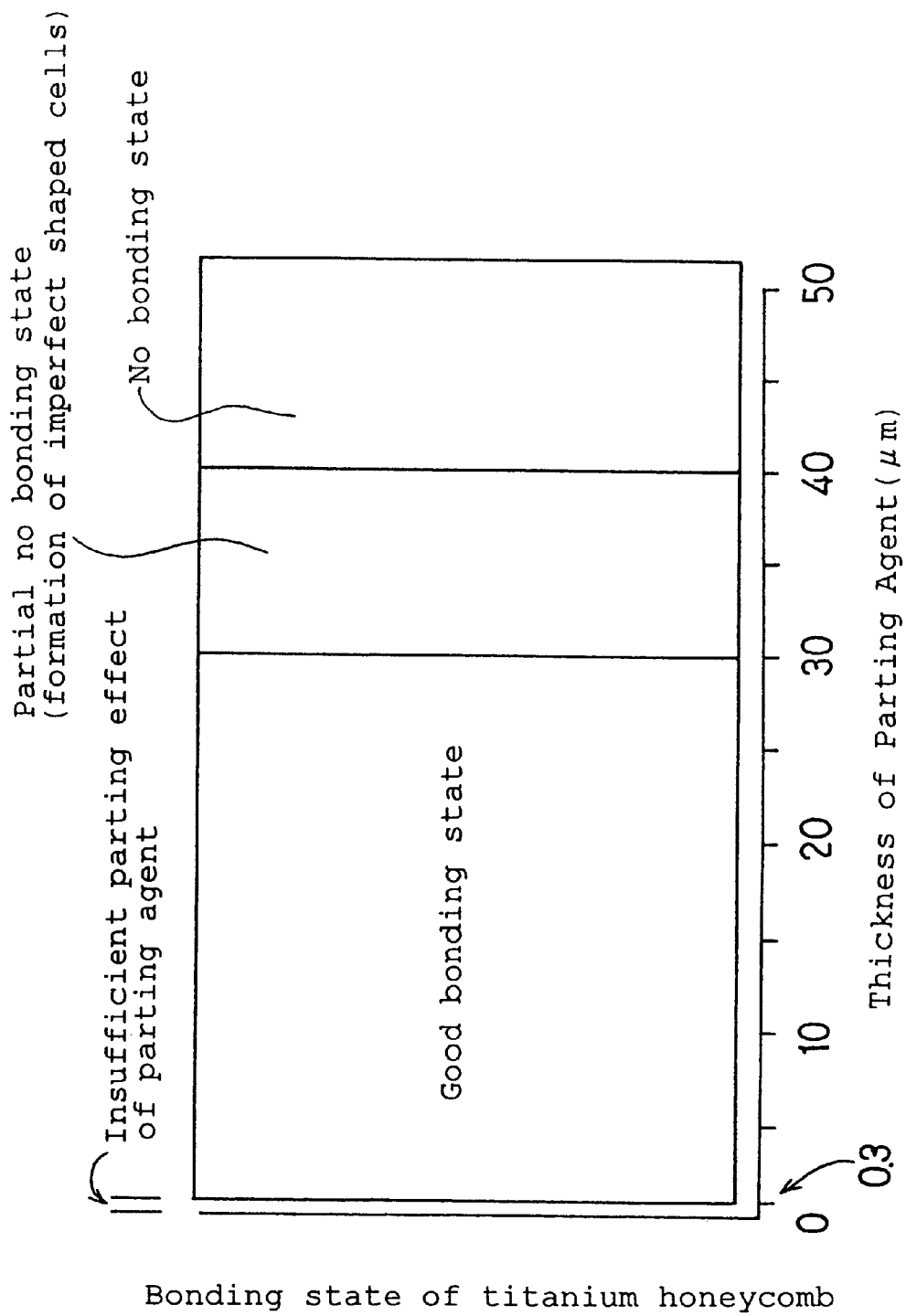
FIG. 7 is a diagram showing the ranges illustrating the relationship between the bonding state of the titanium honeycomb and the thickness of the parting agent applied and illustrating the preferred embodiment of the invention.

FIG. 7 is a diagram showing the area of the relation between the bonding state of the titanium honeycomb and the thickness of the parting agent applied in the invention.

In Example 5 as shown in FIG. 7, the parting agent used in this invention was first prepared by mixing powder of yttrium oxide as one example of rare earth metal oxides with the binder in the ratio of 3 to 7 in % by weight. The parting agent prepared in this manner was applied in a striped pattern to the surfaces of the titanium foils having the thickness of 50 μm with the same thickness. The foils having same thickness of the parting agent applied were piled each other in such a manner that the matrices on the foil were met together with a half pitch shift between them. After the foils piled were heated at 900° C. for 480 minutes while pressing with 0.5 Kg/mm² for diffusion bonding, the foils were elongated so as to form the titanium honeycomb (referred to each steps of FIGS. 1A–F).

Titanium honeycombs were produced in this manner except that the thickness of the parting agent applied was varied to various sizes. The states of the diffusion bonding in the titanium honeycombs formed were checked respectively by the tensile test.

The results of Example 5 were shown in FIG. 7. As confirmed in Example 4, when the thickness of the parting agent applied was less than 0.3 μm, the thickness was too thin to give the honeycomb to sufficient parting effect to observed was insufficient. Therefore, not less than 0.3 μm of the thickness was required.

On the other hand, when the thickness of the parting agent applied was more than 30 μm, each portion for diffusion bonding between the matrices of the base materials piled can not contact closely with each other.

From these results, it turned out that the thickness for applying the parting agent in the present invention to apply the foil of titanium or titanium alloy as the base material is preferably 30 μm or less.

Consequently, the particle size of the powder of rare earth oxide such as yttrium oxide is preferably 30 μm or less. These matters have been appeared by the results of Examination 5. From Examinations 1, 2, 3, 4, and 5, the above mentioned results about the parting agent were obtained.

The present invention was constructed as described above. Therefore, the effects of the present invention are illustrated as follows. In the method for manufacturing the titanium honeycomb 1, the base material 2 of titanium or titanium alloy is like a thin foil, and the parting agent 5 is applied in a striped pattern with remaining the primary coat 3. After the base materials 2 are piled with a half pitch shift between them, they are bounded by diffusion bonding (refer to FIGS. 1A–E and FIG. 3).

The primary coats 3 exposing on the surface of the base materials 2 are contacted, met, and bound with each other with forming the diffusion bonding portions 6. Thus, the base materials 2 piled are bound directly and closely with each other by diffusion bonding between the diffusion bonding portions 6 formed in a striped pattern because the elements of titanium or titanium alloy move and diffuse between the primary coats 3.

Thereafter, the titanium honeycomb 1 of a planner assembly of a number of the hollow columnar cells 8 having the cell walls 7 is obtained by elongating the base materials 2 piled and bound by diffusion bonding in this manner with tensile force (refer to FIG. 1F and FIG. 2).

In this manufacturing method for producing the titanium honeycomb 1 in the manner, the mixture of rare earth oxide powder such as yttrium oxide powder in an amount of 1% by weight or more and the binder vaporizing at not more than 350° C. is employed as a parting agent. The parting agent is pasty and applied to the base material 2 of titanium or titanium alloy.

Therefore, the advantages of the method for manufacturing the titanium honeycomb 1 are described as following first to third manufacturing methods.

Firstly, in the method for manufacturing the titanium honeycomb 1, after the parting agent 5 was applied in a striped pattern to the foil-like base material 2 of titanium or titanium alloy. That is, the titanium honeycomb 1 can be manufactured by simple process.

Further, because the titanium honeycomb 1 comprising a planner assembly of a number of hollow columnar cells 8 and extending wide space is manufactured by elongating in the final step, in the steps for application, pile, diffusion bonding, or the like, a wide space is not required. That is, wide space is not required in all of the steps for manufacturing the titanium honeycomb 1.

Secondly, in the method for manufacturing the titanium honeycomb 1, the foil-like base materials 2 of titanium or titanium alloy are joined each other by diffusion bonding on the diffusion bonding portion 6. That is, the join of the titanium honeycomb 1 to be manufactured is performed directly by diffusion bonding between each of the cell walls 7 without using the material for spot welding, adhesive, and brazing material.

Consequently, the titanium honeycomb 1 can possess the excellent characteristics of titanium or titanium alloy, such as stiffness, heat resistance, corrosion resistance, or the like, because the titanium honeycomb comprises only the base materials 2 of titanium or titanium alloy.

Thirdly, in the method for manufacturing the titanium honeycomb 1, the mixture of rare earth oxide powder such as yttrium oxide powder in an amount of 1% by weight or more and the organic binder, for example, the binder vaporizing at not more than 350° C. is employed as the parting agent 5.

Although this parting agent 5 employs an oxide of rare earth element having low standard free energy of formation (heat of formation) ΔH, the standard free energy of rare earth oxide is lower than that of titanium or titanium alloy. Thus, the parting agent 5 does not react with the base material 2 in the heat treatment for diffusion bonding, because rare earth oxide employed in the parting agent 5 is stable to heat and chemical agent.

In this parting agent 5, an organic binder vaporizing at less than 350° C. is employed instead of the inorganic binder containing metal. Therefore, the binder used in the parting agent 5 does not remain to react with the base material 2 in the heat treatment at 350° C. or more.

When the parting agent 5 is applied to the base materials 2 of titanium or titanium alloy being active metal, the parting agent 5 does not react with titanium or titanium alloy on the surfaces of the base material 2, because the parting agent 5 comprises of such mixture of the rare earth oxide and the binder.

Accordingly, the formation of brittle layer on the surface of base material 2 is prevented. The portion on which diffusion bonding is not performed can be determined on the base material 2 of titanium or titanium alloy, because when the parting agent 5 is applied in a thickness of 0.3 μm or more, the parting agent 5 shows the parting effect expected.

The breaking elongation of the titanium honeycomb 1 can be maintained and does not lower. The breaking elongation of, for example, 5–15% that is required for elongating the base materials 2 can be maintained because brittle layer is not formed on the base material of titanium or titanium alloy. The base materials 2 piled are elongated so that the striped shaped portions other than the diffusion bonding portions 6 on the base material 2 can be separated each other as expected.

Because the parting agent 5 in which the size of rare earth oxide is 30 μm or less is applied to a thickness of 30 μm or less, the diffusion bonding portions 6 on the base materials 2 made of titanium or titanium alloy and piled can be joined each other in a striped pattern definitely.

Consequently, in this method for manufacturing the titanium honeycomb 1, the step for diffusion bonding or expansion is smoothly performed without any hindrance.

As described above, in the method for manufacturing the titanium honeycomb according to the present invention, the titanium honeycomb is manufactured by using titanium or titanium alloy as a base material, performing diffusion bonding in a striped pattern with heating and pressing, and elongating the base materials piled. Further, in the method, the powder of rare earth oxide such as yttrium oxide with a particle size of, for example, 30 μm or less is employed as parting agent. The oxide is mixed in an amount of 1% by weight or more with the organic binder vaporizing at 350° C. A parting agent is applied to a thickness of 0.3–30 μm. Therefore, the present invention has the effects as follows.

Firstly, titanium honeycomb can be easily manufactured at low cost and the large sized titanium honeycomb can be manufactured. In the method for manufacturing titanium honeycomb according to the present invention, the expansion process is employed instead of the corrugation process employed in the method of such conventional art described above.

In the method of the present invention, the titanium honeycomb is manufactured in the steps of preparing, piling, joining, and elongating the base material, while in the method of the conventional art, it is manufactured in the steps of preparing, corrugating, piling, and joining the base material. These steps of the present invention make the manufacturing process simple and as a result, the manufacturing cost of the invention is lowered.

Further, unlike the conventional method in which large space is required because of performing corrugation of sheet in the first step, the method of the present invention does not require large space in all steps because of performing breaking elongation in the last step. Accordingly, a large sized titanium honeycomb or the titanium honeycomb having large sized cells can be manufactured in a relatively limited space. That is, a large block of titanium honeycomb or the titanium honeycomb having low density.

Secondly, the excellent characteristics of titanium or a titanium alloy, for example, stiffness, strong corrosion resistance, or the like, can be utilized as base materials. The titanium honeycomb having the excellent characteristics such as stiffness, heat resistance, corrosion resistance, or the like can be manufactured.

In the method for manufacturing the titanium honeycomb according to the present invention, joining between the cell walls of the base material is performed by diffusion bonding unlike the above mentioned conventional method using ① spot welding, ② bonding, ③ brazing, or the like. In this titanium honeycomb, joining between the cell walls are directly performed diffusion bonding without using ① the material for spot welding, ② adhesive, ③ brazing material, or the like. Thus, the titanium honeycomb comprises only the base materials of titanium or titanium alloy.

The method for manufacturing the titanium honeycomb of the present invention is excellent in low production cost because in this method, ① spot welding requiring number of spots to be welded is not employed and ② adhesive, ③ brazing material, or the like is not necessary for joining.

Because, unlike the above mentioned conventional method, the method of the invention does not require ② adhesive, the characteristics of the titanium honeycomb manufactured in this method, such as stiffness, heat resistance, corrosion resistance, or the like are not determined by the characteristics of the adhesive used.

Also, unlike the above mentioned conventional method, since the method of the invention does not require ③ brazing material, the base materials of titanium or titanium alloy (the cell walls) are not corroded with brazing material by heat or pressure in brazing, and therefore, erosion which means formation of holes and exfoliation on the surfaces does not occur. Further, unlike the above mentioned conventional method, the rigid and brittle intermetallic compounds are not generated between the base materials of titanium or titanium alloy (the cell walls) and brazing material. Furthermore, unlike the above mentioned conventional method, lowering of corrosion resistance of the titanium honeycomb, with the resulting that the joints between the respective base materials of titanium or titanium alloy (the cell walls) are bonded with the brazing material having the metals which are different from the metal of base material.

Accordingly, in the method of the present invention, the excellent identities of titanium or a titanium alloy, for example, stiffness, strong corrosion resistance, or the like, can be utilized sufficiently as base materials. The titanium honeycomb having the excellent characteristics such as stiffness, heat resistance, corrosion resistance, or the like can be manufactured.

Thirdly, the parting agent applied does not react with the base material of titanium or titanium alloy at the heat treatment.

Thus, formation of brittle layers of the titanium honeycomb and loss of the parting effect of the parting agent applied are prevented. The titanium honeycomb can be certainly manufactured without accidents in which a part of the titanium honeycomb is braked and difficulty or impossibility of elongating the titanium honeycomb.

That is, in the method for manufacturing the titanium honeycomb according to the present invention, since the expansion process utilizing diffusion bonding is employed, no bonding portions should be determined by applying the parting agent before diffusion bonding portion is performed in a striped pattern on the diffusion bonding portion.

And, in the present invention, as a parting agent, a rare earth oxide is used together with the organic binder which does not contain metal and vaporizes at less than 350° C. Thus, when the heat treatment is performed for diffusion bonding after the parting agent is applied to the base material, the parting agent never reacts with the base material of titanium or titanium alloy.

That is, when the heat treatment is performed for diffusion bonding in the method of the present invention, unlike this kind of conventional manufacturing method which has been recently developed and in which hexagonal boron nitride is used for a parting agent as described above, the rigid and brittle intermetallic compounds are not generated by the reaction between the parting agent applied and titanium or titanium alloy on the surface of the base material. Therefore, the formation of the brittle layers on the surface of the base material and breaking of the surface such as crack are prevented.

Further, in this method, the breaking elongation of the base material to which the parting agent is applied does not lowered unlike this kind of conventional method which has been developed recently and described above.

Furthermore, since loss of the parting effect of the agent is prevented, the base materials of titanium or titanium alloy to which the parting agent is applied can be separated definitely without bonding after the heat treatment is performed for diffusion bonding. In particular, when the parting agent is applied to a thickness of 0.3 $\mu$m or more, the parting effect can be obtained definitely.

Thereby, in the method for manufacturing the titanium honeycomb according to the present invention, the titanium honeycomb can be manufactured certainly without the problems as follows. When the base materials piled are elongated with tensile force, titanium or titanium alloy as base materials piled is not broken, the difficulty in elongating the base materials which results from the insufficient breaking elongation of the base materials does not occur, the impossibility in elongating the base materials joined by diffusion bonding which results from the loss of the parting agent does not occur.

In the method for manufacturing the. titanium honeycomb according to the present invention, when the parting agent is applied to a thickness of 30 $\mu$m or less and the particle size of the rare earth oxide powder used for the agent is 30 $\mu$m or less, generations of no diffusion bonding portions between the base materials of titanium or titanium alloy and formations of the incomplete shaped cells are prevented definitely.

In addition, when yttrium oxide is used as a rare earth oxide, the present invention is excellent in cost of manufacturing the titanium honeycomb. In the method of the present invention for manufacturing the titanium honeycomb, when yttrium oxide widely used for ceramics, parts for electronic apparatus, or the like is used as a rare earth oxide for the parting agent, the cost of the parting agent is very low. Thus, the present invention has the advantage of saving the manufacturing cost.

The effects of the present invention by which the problems of this kind of prior art can be solved are prominent and excellent.

What is claimed is:

1. A method of manufacturing honeycomb structures made of titanium or a titanium alloy and consisting of a planar assembly of a plurality of equihexagonal hollow columnar cells divided by cell walls of titanium or the titanium alloy as a base material, said method comprising the steps of:

forming foil sheets of titanium or the titanium alloy having a thickness no greater than 200 μm;

applying a parting agent comprising at least 1 wt. % of rare earth oxide powder having a particle size no greater than 30 μm and a standard free energy of formation lower than that of titanium or the titanium alloy and less than 99 wt. % of a binder of an organic material which does not react with the foil sheets at a temperature of 350° C. or higher and volatilizes at a temperature of less than 350° C. in a thickness of from 0.3 to 30 μm onto a surface of the foil sheets in a striped pattern with a predetermined pitch and width such that the surface of the foil sheets has exposed portions in a striped pattern;

stacking a plurality of the foil sheets such that the exposed portions of adjacent foil sheets are shifted by a half pitch from one another;

performing diffusion bonding of the stacked foil sheets at their exposed portions under sufficient heat and pressure such that titanium and/or alloy constituents diffuse and move between the exposed portions and form diffusion bonded portions and non-bonded portions; and expanding the stacked foil sheets by pulling the top and bottom of the stacked foil sheets in opposite directions by a tensile force to cause the foil sheets to separate along edges of diffusion bonded portions and non-bonded portions thereby forming a honeycomb structure.

2. The method of claim 1, wherein the rare earth oxide powder is a powder of yttrium oxide.

3. The method of claim 1, wherein the honeycomb structures are made from a titanium alloy containing at least one metal selected from the group consisting of aluminum, vanadium, chromium, manganese, iron, zirconium, molybdenum and tin.

4. The method of claim 3, wherein the titanium alloy is selected from the group consisting of Ti—5Al—2.5Sn, Ti—3Al—2.5V and Ti—6Al—4V.

5. The method of claim 1, wherein the rare earth oxide powder is selected from the group consisting of powder of cerium oxide and a powder of thorium oxide.

* * * * *